(12) United States Patent
Lee et al.

(10) Patent No.: US 9,437,221 B2
(45) Date of Patent: Sep. 6, 2016

(54) METHOD OF MAKING A TRANSDUCER HEAD

(71) Applicant: Seagate Technology LLC, Cupertino, CA (US)

(72) Inventors: Lien Lee, Saint Paul, MN (US); Yongjun Zhao, Eden Prairie, MN (US); Lijuan Zou, Eden Prairie, MN (US); Mark Henry Ostrowski, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/840,600

(22) Filed: Aug. 31, 2015

(65) Prior Publication Data

US 2015/0371669 A1     Dec. 24, 2015

Related U.S. Application Data

(62) Division of application No. 13/794,133, filed on Mar. 11, 2013, now Pat. No. 9,142,231.

(51) Int. Cl.
*G11B 5/31* (2006.01)
*G11B 5/60* (2006.01)
*G11B 5/00* (2006.01)

(52) U.S. Cl.
CPC .............. *G11B 5/314* (2013.01); *G11B 5/3163* (2013.01); *G11B 5/6088* (2013.01); *G11B 2005/0021* (2013.01); *Y10T 29/49048* (2015.01); *Y10T 29/49052* (2015.01)

(58) Field of Classification Search
CPC .......... G11B 5/11; G11B 5/127; G11B 5/187
USPC ........................................ 360/125.01–125.07
See application file for complete search history.

(56) References Cited

U.S. PATENT DOCUMENTS

| | | | |
|---|---|---|---|
| 7,996,986 B2 | 8/2011 | Gokemeijer | |
| 8,139,448 B1* | 3/2012 | Hirano | G11B 5/105 369/112.27 |
| 8,307,540 B1* | 11/2012 | Tran | G11B 5/314 219/209 |
| 8,375,564 B1 | 2/2013 | Luo et al. | |
| 8,413,317 B1 | 4/2013 | Wan et al. | |
| 8,451,707 B1 | 5/2013 | Stipe | |
| 8,486,286 B1* | 7/2013 | Gao | G11B 5/1278 216/22 |
| 8,491,801 B1 | 7/2013 | Tanner et al. | |
| 8,526,275 B1* | 9/2013 | Yuan | G11B 5/314 369/13.14 |
| 8,565,049 B1* | 10/2013 | Tanner | G11B 5/3136 369/13.03 |
| 8,588,039 B1* | 11/2013 | Shi | G11B 5/314 369/13.13 |
| 8,619,512 B1 | 12/2013 | Yuan et al. | |

(Continued)

FOREIGN PATENT DOCUMENTS

WO     2012-085849 A2     6/2012

OTHER PUBLICATIONS

International Search Report and Written Opinion of PCT/US2014/019310, mailed Jun. 18, 2014.

*Primary Examiner* — Allen T Cao
(74) *Attorney, Agent, or Firm* — HolzerIPLaw, PC

(57) ABSTRACT

A method of making a transducer head disclosed herein includes depositing a spacer layer on an NFT layer of the transducer head, forming an etch stop layer on a spacer layer of a transducer, depositing a cladding layer on the etch stop layer, and milling the cladding layer at a sloped angle such that the milling stops at the etch stop layer.

19 Claims, 11 Drawing Sheets

(56) References Cited

U.S. PATENT DOCUMENTS

| | | | |
|---|---|---|---|
| 8,634,280 B1 | 1/2014 | Wang et al. | |
| 8,670,294 B1 * | 3/2014 | Shi | G11B 5/314 360/59 |
| 8,721,902 B1 | 5/2014 | Wang et al. | |
| 8,773,956 B1 | 7/2014 | Wang et al. | |
| 8,790,527 B1 * | 7/2014 | Luo | B29D 11/00663 216/24 |
| 8,834,728 B1 | 9/2014 | Hu et al. | |
| 8,873,353 B1 | 10/2014 | Riddering | |
| 9,019,803 B1 * | 4/2015 | Jin | G11B 13/08 369/13.33 |
| 9,099,112 B1 * | 8/2015 | Balamane | G11B 5/314 |
| 9,183,856 B1 * | 11/2015 | Balamane | G11B 5/39 |
| 9,202,493 B1 * | 12/2015 | Wan | G11B 5/6088 |
| 2004/0219729 A1 * | 11/2004 | Kang | G11C 7/00 438/200 |
| 2005/0000935 A1 | 1/2005 | Snyder et al. | |
| 2010/0214685 A1 * | 8/2010 | Seigler | G11B 5/02 360/59 |
| 2010/0321815 A1 | 12/2010 | Zhou et al. | |
| 2011/0286610 A1 | 11/2011 | Ronald | |
| 2011/0294398 A1 | 12/2011 | Hu et al. | |
| 2012/0043586 A1 * | 2/2012 | Nishimori | H01L 29/0657 257/194 |
| 2012/0298621 A1 | 11/2012 | Gao | |
| 2013/0064051 A1 * | 3/2013 | Peng | G11B 5/3133 369/13.33 |
| 2013/0107680 A1 * | 5/2013 | Contreras | G11B 13/04 369/13.32 |
| 2014/0029890 A1 * | 1/2014 | Sun | G02B 6/422 385/14 |
| 2014/0307534 A1 * | 10/2014 | Zhou | G11B 13/08 369/13.33 |
| 2014/0342559 A1 * | 11/2014 | Wang | H01L 21/30625 438/692 |
| 2014/0355399 A1 * | 12/2014 | Huang | G11B 5/3133 369/13.17 |
| 2015/0072593 A1 * | 3/2015 | Zhao | B24B 49/10 451/1 |
| 2015/0079775 A1 * | 3/2015 | Wu | H01L 21/28158 438/587 |
| 2015/0318005 A1 * | 11/2015 | Kim | G11B 5/4866 369/13.32 |
| 2015/0340052 A1 * | 11/2015 | Sankar | G11B 5/6088 369/13.33 |

* cited by examiner

METHOD OF MAKING A TRANSDUCER HEAD

CROSS-REFERENCE TO RELATED APPLICATION

The present application is a divisional application of U.S. patent application Ser. No. 13/794,133 filed Mar. 11, 2013, and titled "Method Of Making A Transducer Head", and expected to issue on Sep. 22, 2015 as U.S. Pat. No. 9,142,231, which is hereby incorporated by reference in its entirety.

BACKGROUND

Thermally assisted magnetic recording or heat-assisted magnetic recording (HAMR) generally refers to the concept of locally heating a recording medium to reduce the coercivity of the medium. Such reduced coercivity allows the applied magnetic writing fields to more easily direct the magnetization within the recording medium during the temporary magnetic softening caused by the heat source. HAMR allows for the use of small grain media, with a larger magnetic anisotropy at room temperature to assure sufficient thermal stability, which is desirable for recording at increased areal densities. HAMR can be applied to any type of magnetic storage media including tilted media, longitudinal media, perpendicular media, and patterned media. By heating the media, the $K_u$ or coercivity is reduced such that the magnetic write field is sufficient to write to the media. Once the media cools to ambient temperature, the coercivity has a sufficiently high value to assure thermal stability of the recorded information.

In HAMR, information bits are recorded on a data storage medium at elevated temperatures, and the data bit dimension can be determined by the dimensions of the heated area in the storage medium or the dimensions of an area of the storage medium that is subjected to a magnetic field. In one approach, a beam of light is condensed to a small optical spot onto the storage medium to heat a portion of the medium and reduce the magnetic coercivity of the heated portion. One example of a recording head for use in HAMR generally includes a write pole and a return pole magnetically coupled to each other through a yoke or pedestal, and a waveguide for focusing light onto the storage medium. The waveguide is positioned between the write pole and the return pole. Light is coupled into the waveguide above the yoke and is transmitted through the waveguide on opposite sides of the yoke.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

A method of making a transducer head disclosed herein includes depositing a spacer layer on an NFT layer of the transducer head, forming an etch stop layer on a spacer layer of a transducer, depositing a cladding layer on the etch stop layer, and milling the cladding layer at a sloped angle such that the milling stops at the etch stop layer.

BRIEF DESCRIPTION OF THE DRAWINGS

The described technology is best understood from the following Detailed Description describing various implementations read in connection with the accompanying drawings. These drawings are for illustration purposes and one or more of the dimensions of these drawings may not be to scale.

DETAILED DESCRIPTION

Figure 1:
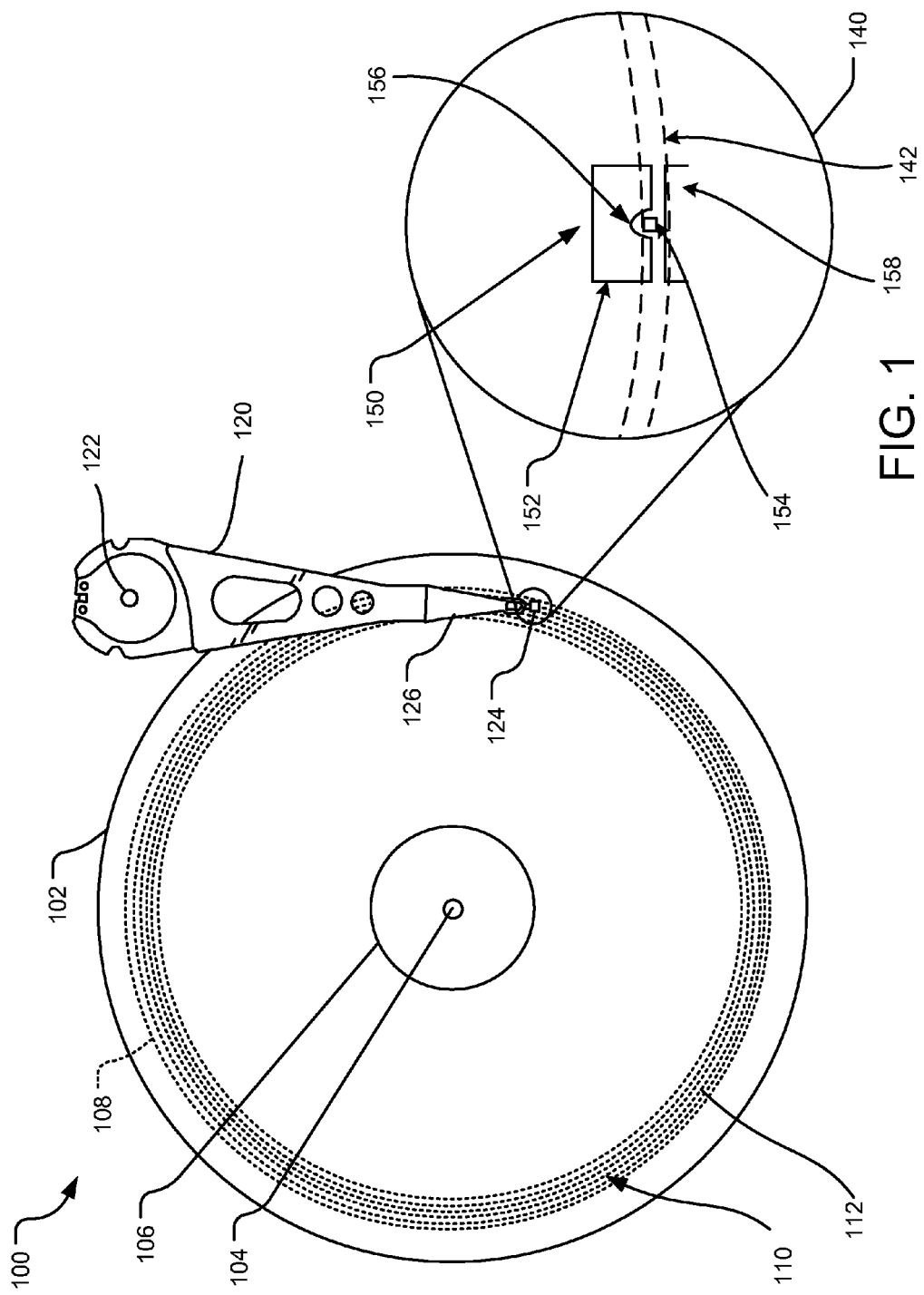
FIG. 1 illustrates an example schematic representation of a recording device including a transducer head according to the implementations disclosed herein.

FIG. 1 illustrates a perspective view of an example recording device 100 including a transducer head using an NFT according to the implementations disclosed herein. The recording device 100 includes a disc 102, which rotates about a spindle center or a disc axis of rotation 104 during operation. The disc 102 includes an inner diameter 106 and an outer diameter 108 between which are a number of concentric data tracks 110, illustrated by circular dashed lines. The data tracks 110 are substantially circular and are made up of regularly spaced patterned bits 112, indicated as dots or ovals on the disc 102 as well as in an exploded view 140. It should be understood, however, that the described technology may be employed with other types of storage media, including continuous magnetic media, discrete track (DT) media, etc.

Information may be written to and read from the bits 112 on the disc 102 in different data tracks 110. A transducer head 124 is mounted on an actuator assembly 120 at an end distal to an actuator axis of rotation 122 and the transducer head 124 flies in close proximity above the surface of the disc 102 during disc operation. The actuator assembly 120 rotates during a seek operation about the actuator axis of rotation 122 positioned adjacent to the disc 102. The seek operation positions the transducer head 124 over a target data track of the data tracks 110.

The exploded view 140 illustrates data tracks 142 and a transducer head 150 (not to scale) located over the data tracks. The example transducer head 150 includes a write pole 152 and a near field transducer (NFT) 154 located near the write pole 152. In the example implementation, the surface of the write pole 152 facing the NFT 154 has a notch 156. In the illustrated implementation, the notch 156 has a curved shape. However, in an alternative implementation, the notch 156 may have other shape, such as a rectangular shape, a square shape, a triangular shape, etc. Alternatively, the write pole 152 may have a flat surface without a notch. In the illustrated implementation, the NFT 154 is positioned in the notch 156 such that the NFT intersects the surface of the write pole 152 facing the NFT 154.

The transducer head 150 also includes a core 158 that is located on the other side of the NFT 154 from the write pole 152. The transducer head 150 may also include other components, such as top cladding, lower shield, reader sensor, top shield, heat sink, etc., that are not shown in the illustrated implementation of the transducer head 150. The distance between the innermost point of the notch 156 and the NFT 154 is referred to herein as the NFT-to-pole spacing (NPS). On the other hand, the distance between the surface of the write pole 152 facing the NFT and the core 158 is referred to as the core-to-pole spacing (CPS). Various processes discussed in this application allow controlling the NPS and/or the CPS using a spacer layer during the manufacturing of the transducer head 150.

Figure 2:
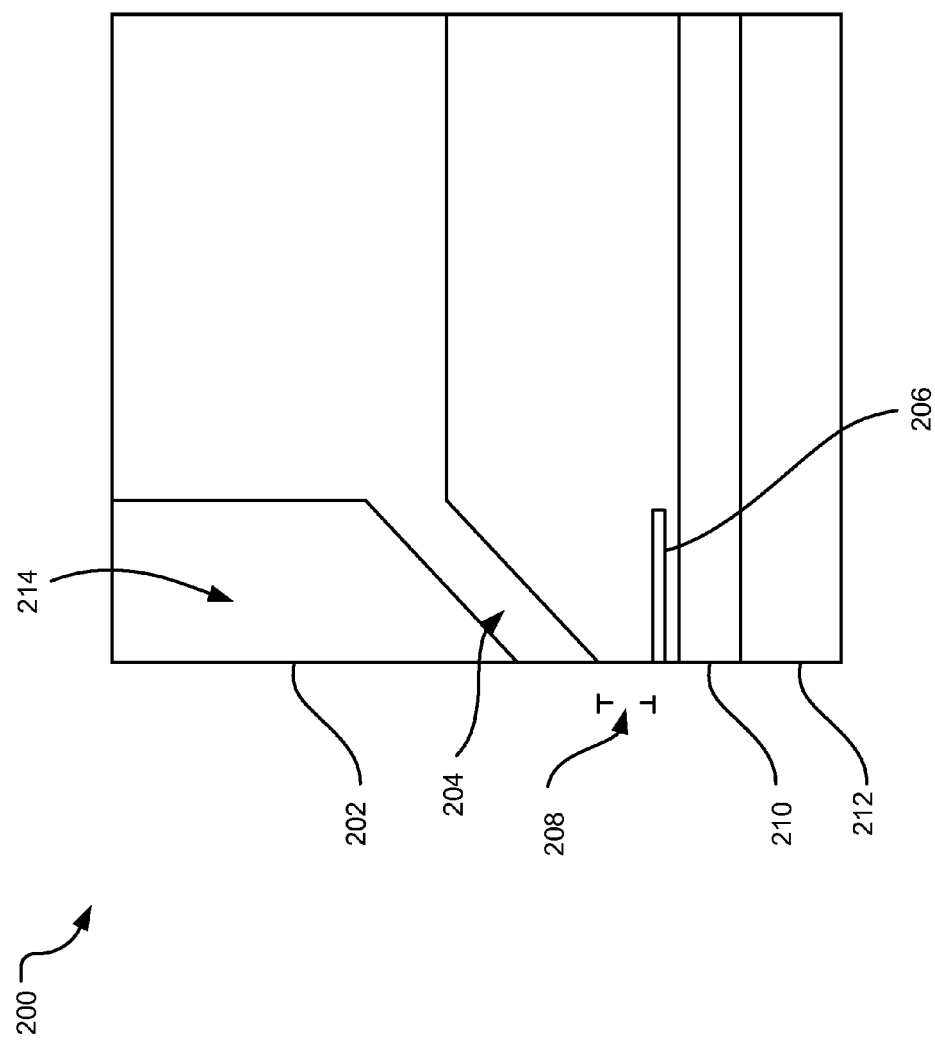
FIG. 2 illustrates an alternative schematic representation of a cross-sectional view of a portion of a transducer head according to the implementations disclosed herein.

FIG. 2 illustrates an alternative schematic representation of a cross-sectional view of a portion of a transducer head 200 according to the implementations disclosed herein. Specifically, FIG. 2 illustrates the transducer head 200 having an air-bearing surface 202 that faces recording medium. The transducer head 200 includes a write pole 204 separated by an NFT 206 by a NPS distance of 208. In one implementation of the transducer head 200, the NFT 206 also includes an NFT heat sink. Additionally, the transducer head 200 may also include a core 210, a cladding 212, and an optional heat sink 214. It is typically difficult to control the NPS distance 208 at the ABS 202. Various processes discussed in this application allow controlling the NPS distance 208 using a spacer layer during the manufacturing of the transducer head 150.

Figure 3:
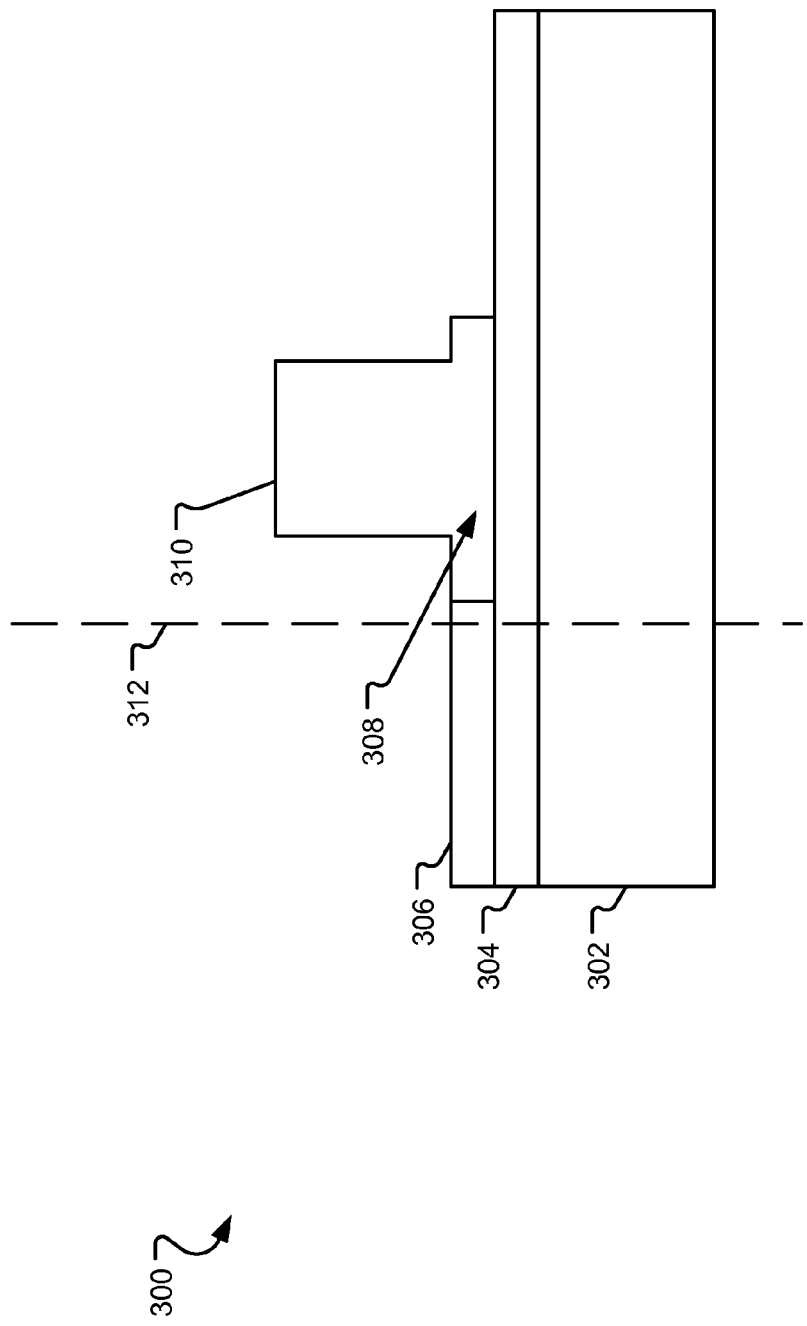
FIG. 3 illustrates a stage in the process for forming a notched recording head according to the implementations disclosed herein.

FIG. 3 illustrates a stage in the process for forming a notched recording head according to the implementations disclosed herein. Specifically, FIG. 3 illustrates a partial transducer head 300 with a core 302 with a thin layer 304 of dielectric material disposed thereupon. The partial transducer head 300 also includes an NFT with an NFT peg 306, an NFT disc 308, and an NFT heat sink 310. While the implementation of the partial transducer head 300 illustrates the NFT heat sink 310 to have a rectangular shape, in other implementations the NFT heat sink 310 may also have other shape, such as trapezoidal, etc. In one implementation, the partial transducer head 300 is lapped along an air-bearing surface (ABS) 312 such that a part of the NFT peg 306 is exposed to the ABS 312.

Figure 4:
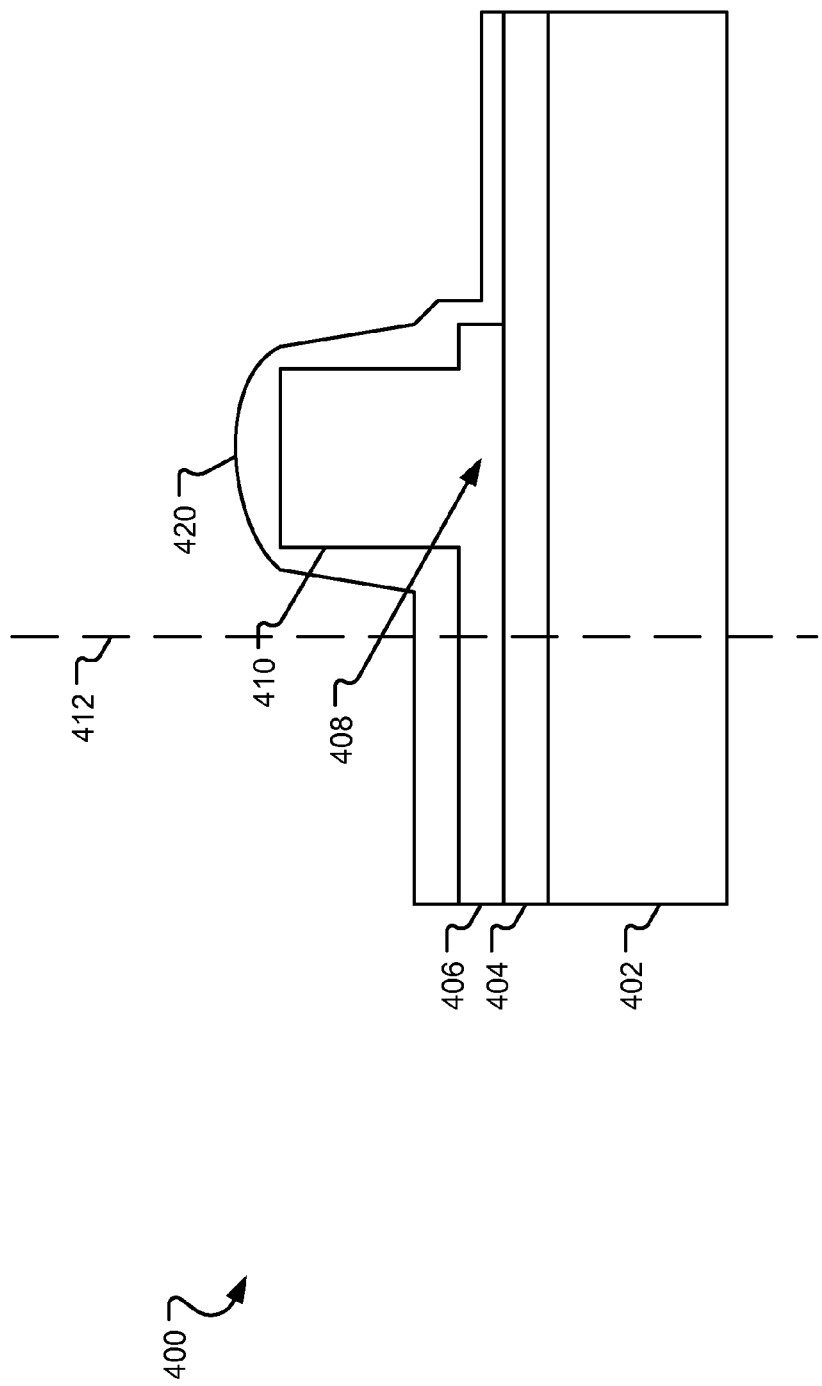
FIG. 4 illustrates another stage in the process for forming a notched recording head according to the implementations disclosed herein.

FIG. 4 illustrates another stage in the process for forming a notched recording head according to the implementations disclosed herein. Specifically, FIG. 4 illustrates a partial transducer head 400 with a core 402 with a thin layer 404 of dielectric material disposed thereupon. The partial transducer head 400 also includes an NFT with an NFT peg 406, an NFT disc 408, and an NFT heat sink 410. The partial transducer 400 may be lapped along an air-bearing surface (ABS) 412 such that a part of the NFT peg 406 is exposed to the ABS 412. The partial transducer 400 also includes a spacer layer 420 deposited on the NFT and the heat sink 410. In one implementation, the spacer layer 420 may be made of an oxide of Aluminum. However, other material such as silicon oxide or other suitable material may also be used for the spacer layer 420. In one implementation of the transducer, an atomic layer deposition (ALD) process is used to deposit the spacer layer 420. However, in alternative implementations, other deposition process may be used to deposit the spacer layer 420. Specifically, the spacer layer 420 is introduced during the manufacturing of the transducer to control the pole to core spacing or the pole to NFT spacing at the ABS 412. The thickness of the spacer layer 420 may be accurately controlled and/or varied by the ALD process.

Figure 5:
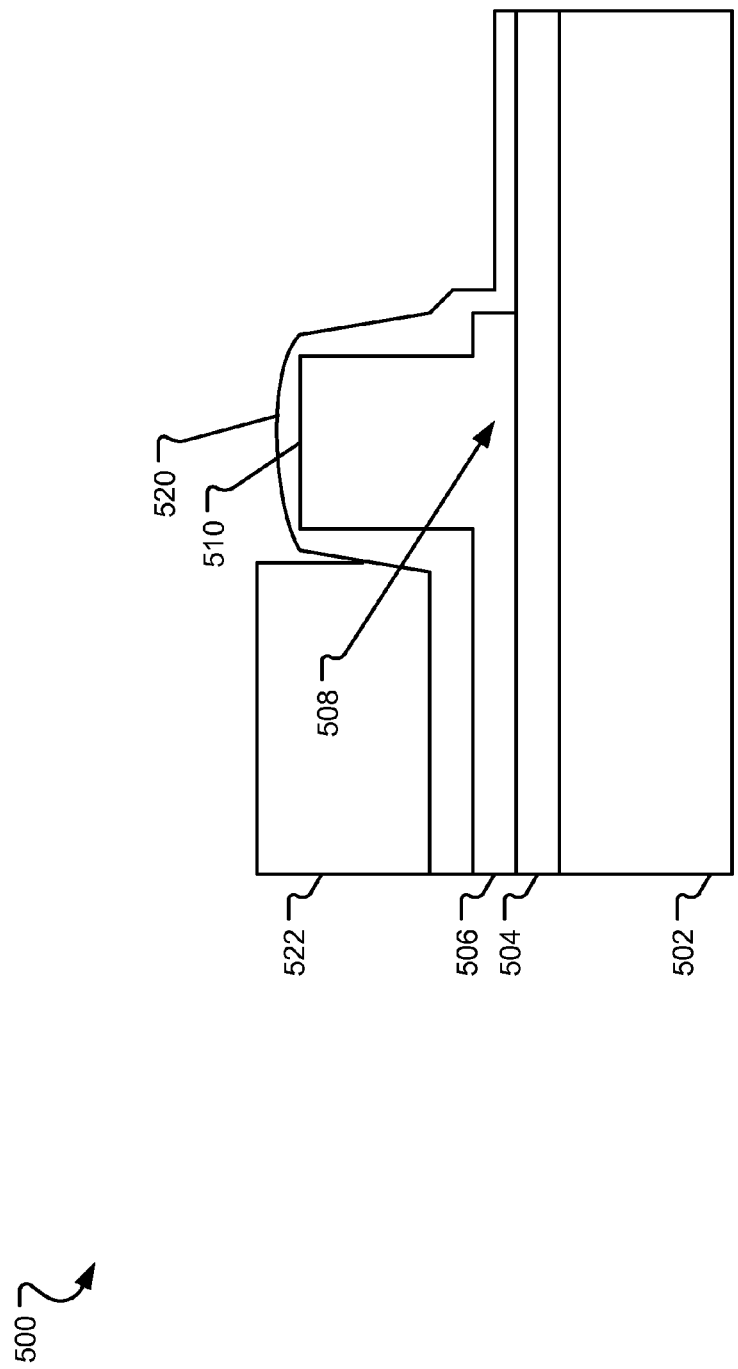
FIG. 5 illustrates another stage in the process for forming a notched recording head according to the implementations disclosed herein.

FIG. 5 illustrates another stage in the process for forming a notched recording head according to the implementations disclosed herein. Specifically, FIG. 5 illustrates a partial transducer head 500 with a core 502 with a thin layer 504 of dielectric material disposed thereupon. The partial transducer head 500 also includes an NFT with an NFT peg 506, an NFT disc 508, and an NFT heat sink 510. The partial transducer 500 also includes a spacer layer 520 deposited on the NFT and the heat sink 510. Furthermore, a photo resist (PR) etch stop layer 522 is formed on at least part of the spacer layer 520.

Alternatively, the etch stop layer 522 may be made of a patterned etch-stop structure made of a thin amorphous carbon (a-C) material. Specifically, such a-C pattern may be made by a process flow including deposition, lithography, and etch process flow. Alternatively, the a-C pattern may be made of a process flow including lithography, deposition, and liftoff. The etch stop layer 522 made of a-C may be cleanly removed by O2 ash. Yet alternatively, the etch stop layer 522 may be made of a metal. Such metal etch stop layer 522 provides high selectivity during a subsequent slope wall milling process. An example of such metal etch stop layer may be a chromium (Cr) etch stop layer. Such Cr etch stop layer may be later removed by a Cr wet etching process. In alternative implementations, other metals may also be used for forming the etch stop layer 522.

Figure 6:
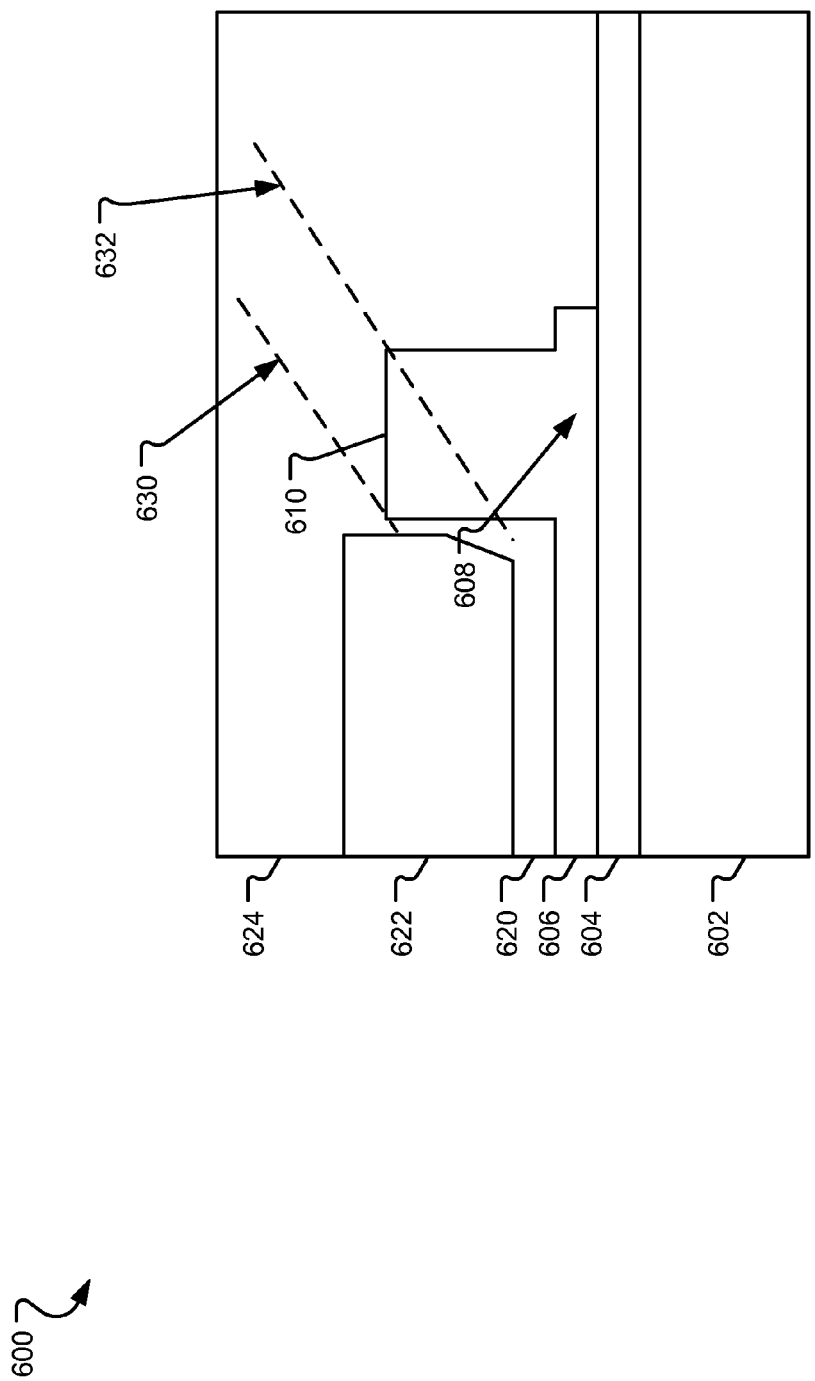
FIG. 6 illustrates another stage in the process for forming a notched recording head according to the implementations disclosed herein.

FIG. 6 illustrates another stage in the process for forming a notched recording head according to the implementations disclosed herein. Specifically, FIG. 6 illustrates a partial transducer head 600 with a core 602 with a thin layer 604 of dielectric material disposed thereupon. The partial transducer head 600 also includes an NFT with an NFT peg 606, an NFT disc 608, and an NFT heat sink 610. The partial transducer 600 also includes a spacer layer 620 deposited on the NFT and the heat sink 610. Furthermore, a photo resist (PR) etch stop layer 622 is formed on at least part of the spacer layer 620. In addition, the transducer head 600 also includes a top cladding layer 624. In one implementation, the top cladding layer is made of the same material as the spacer layer 620.

After the deposition of the top cladding layer 624, the cladding layer 624 and the NFT heat sink 610 are etched using a reactive ion beam etching process in the direction illustrated by the lines 630, 632. Specifically, providing the PR etch stop layer 622 allows the etching to be completed in such a manner such that the NFT-to-pole spacing (NPS) at the ABS can be controlled. Specifically, providing the PR etch stop layer 622 allows the precise positioning of a sloped wall etch to vary as illustrated in FIG. 6, and still control the NPS at the ABS. In other words the quality of the NPS is protected even with the variation of etching from 632 to 630. In one implementation, the etching is accomplished using sloped wall mill process.

Figure 7:
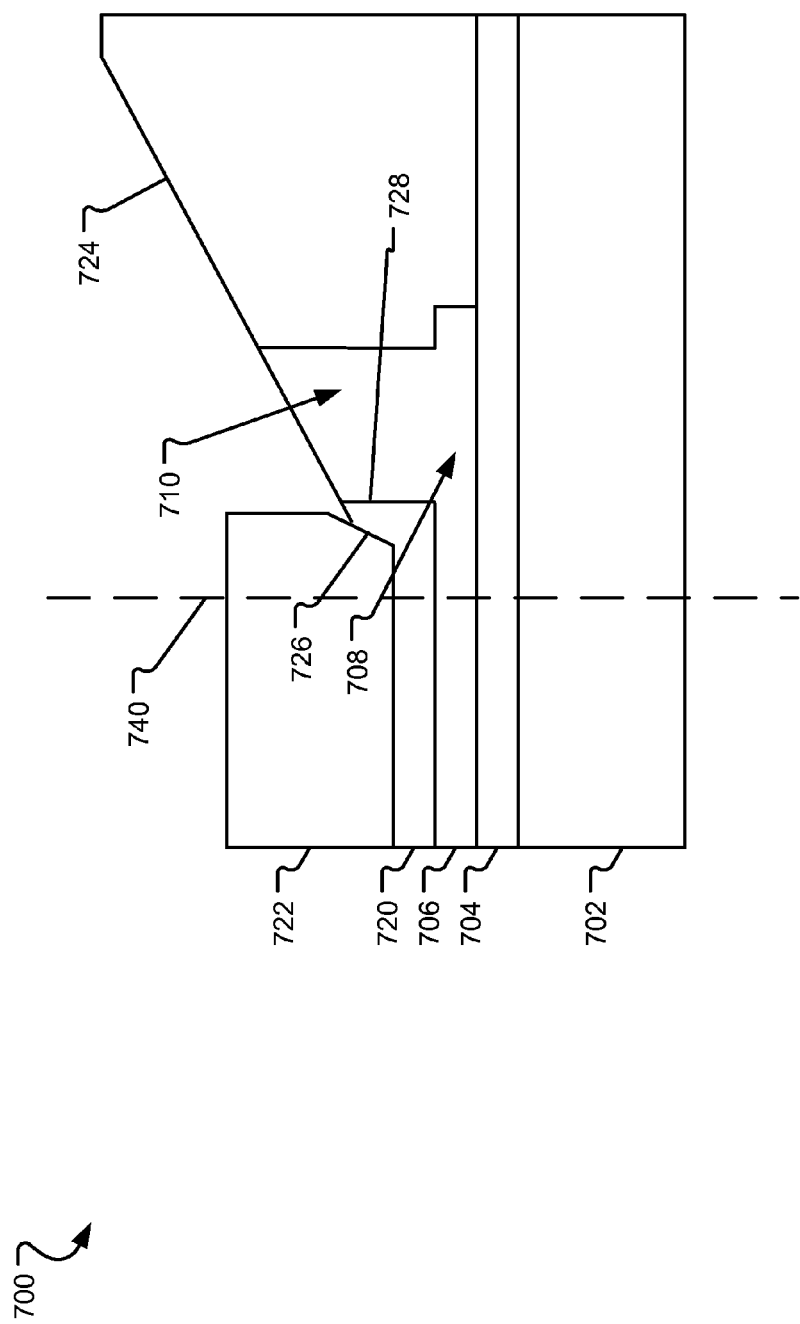
FIG. 7 illustrates another stage in the process for forming a notched recording head according to the implementations disclosed herein.

FIG. 7 illustrates another stage in the process for forming a notched recording head according to the implementations disclosed herein. Specifically, FIG. 7 illustrates a partial transducer head 700 with a core 702 with a thin layer 704 of dielectric material disposed thereupon. The partial transducer head 700 also includes an NFT with an NFT peg 706, an NFT disc 708, and an NFT heat sink 710. The partial transducer 700 illustrates a partial cladding layer 724 that remains on the transducer head 700 after an etching process that removes part of the cladding layer 724 and the heat sink 710. The partial transducer head 700 also includes a PR etch stop layer 722. In an implementation, a surface 726 of the PR etch stop layer 722 facing the NFT heat sink 722 may be parallel to the surface 728 of the NFT heat sink 722 facing the PR etch stop layer 722. As a result, when the cladding layer 724 is etched, the resulting space between the NFT peg 706 and a write pole (not shown) at an ABS 740 is substantially constant irrespective of the position of the etching of the cladding layer 724 and the heat sink 710 or the position of the ABS 740 along the length of the NFT.

Figure 8:
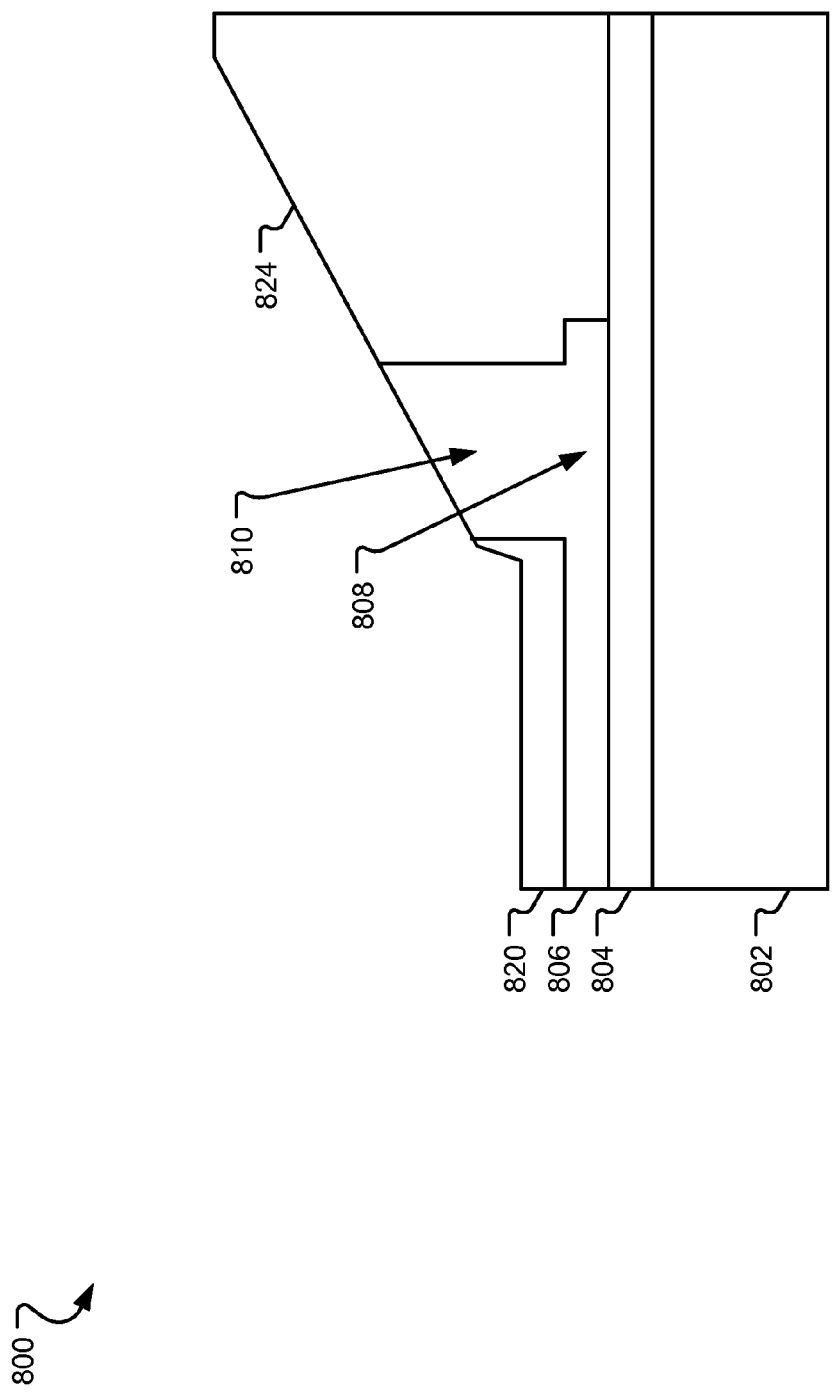
FIG. 8 illustrates another stage in the process for forming a notched recording head according to the implementations disclosed herein.

FIG. 8 illustrates another stage in the process for forming a notched recording head according to the implementations disclosed herein. Specifically, FIG. 8 illustrates a partial transducer head 800 with a core 802 with a thin layer 804 of dielectric material disposed thereupon. The partial transducer head 800 also includes an NFT with an NFT peg 806, an NFT disc 808, and an NFT heat sink 810. As illustrated in FIG. 8, the partial transducer head 800 does not include any PR layer as the PR layer is removed by a strip and an oxygen etching process. In one implementation where the etch stop layer is made of photo resist material, the etch stop removal process may be implemented using an oxygen ash and strip. Alternatively, where the etch stop layer is made of amorphous carbon, the etch stop removal process may use oxygen ash to remove the etch stop layer. Yet alternatively, where the etch stop layer is made of chromium, the etch stop removal process may be implemented using a chromium wet etch process.

Subsequent to the etch stop removal process, the partial transducer 800 includes a spacer layer 820 on top of the NFT peg 806 and the heat sink material 810. Additionally, the partial transducer 800 also includes cladding layer 824 deposited on the dielectric material 804 and the heat sink 810.

Figure 9:
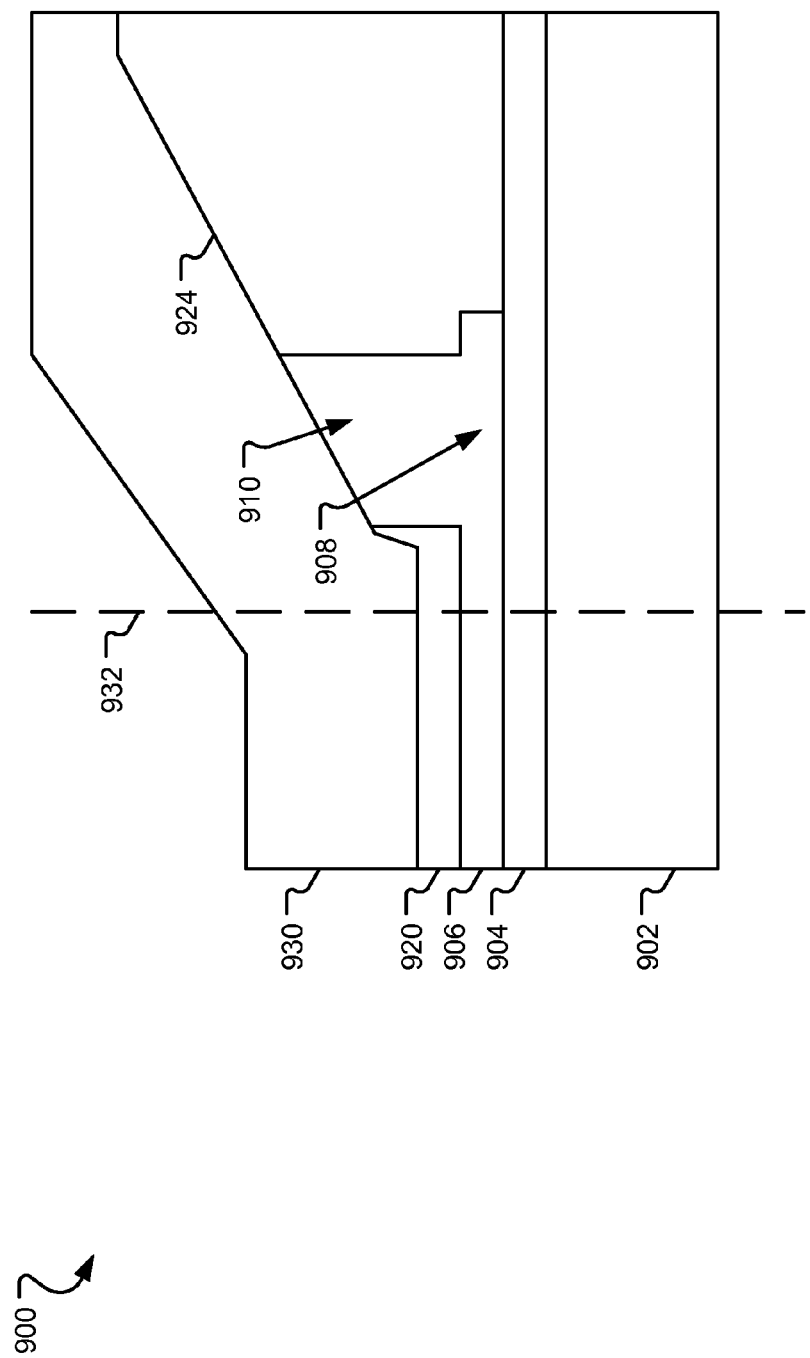
FIG. 9 illustrates another stage in the process for forming a notched recording head according to the implementations disclosed herein.

FIG. 9 illustrates another stage in the process for forming a notched recording head according to the implementations disclosed herein. Specifically, FIG. 9 illustrates a partial transducer head 900 with a core 902 with a thin layer 904 of dielectric material disposed thereupon. The partial transducer head 900 also includes an NFT with an NFT peg 906, an NFT disc 908, and an NFT heat sink 910. Additionally, the partial transducer 900 includes a spacer layer 920 on top of the NFT peg 906 and the heat sink material 910 and a cladding layer 924 deposited on the dielectric material 904 and the heat sink 910. A write pole layer 930 is formed on the top surface of the partial transducer 900 such that the write pole layer 930 is in contact with the spacer layer 920, the heat sink 910, and the cladding layer 924. The partial transducer 900 may be lapped along the ABS 932 such that the spacer layer 920 provides the NPS between the write pole 930 and the NFT peg 920 at the ABS 932.

Figure 10:
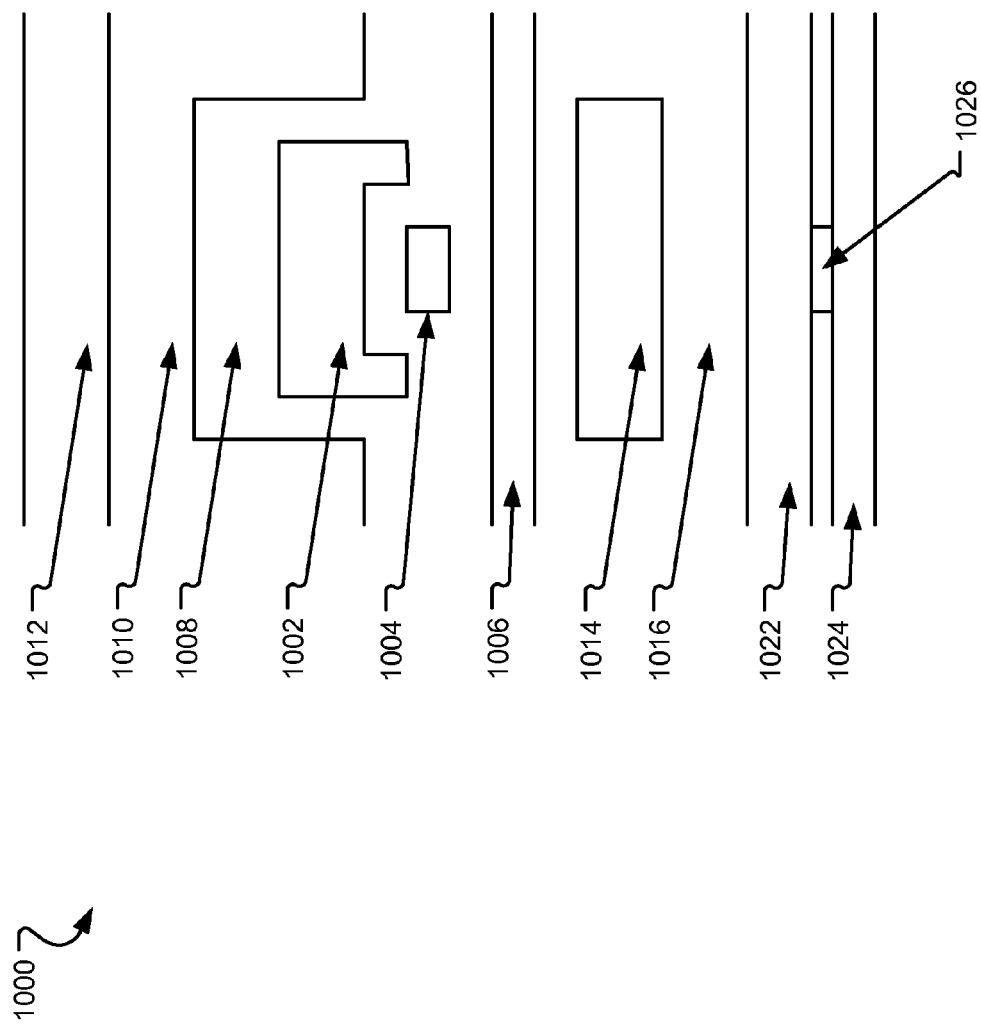
FIG. 10 illustrates an alternative schematic representation of an air-bearing surface view of a transducer head according to the implementations disclosed herein.

FIG. 10 illustrates an alternative schematic representation (not to scale) of an air-bearing surface (ABS) view 1000 of a transducer head according to the implementations disclosed herein. Specifically, the ABS view 1000 discloses a write pole 1002 with a notched surface facing an NFT 1004 and a core layer 1006. The write pole 1002 may be surrounded by a heat sink material 1008 and separated from a first return pole 1012 by a cladding layer 1010. The transducer head 1000 also includes another return pole 1014 that is separated by a bottom cladding layer 1016 from the core 1006. Furthermore, a reader structure of the transducer head 1000 also includes a top shield 1022 and a bottom shield 1024 on opposite sides of a reader sensor 1026. The spacing between the NFT 1004 and the write pole 1002, also referred to as the NFT-to-pole spacing (NPS), is controlled during the manufacturing of the transducer head 1000 by using a spacer layer and a photo resist.

Figure 11:
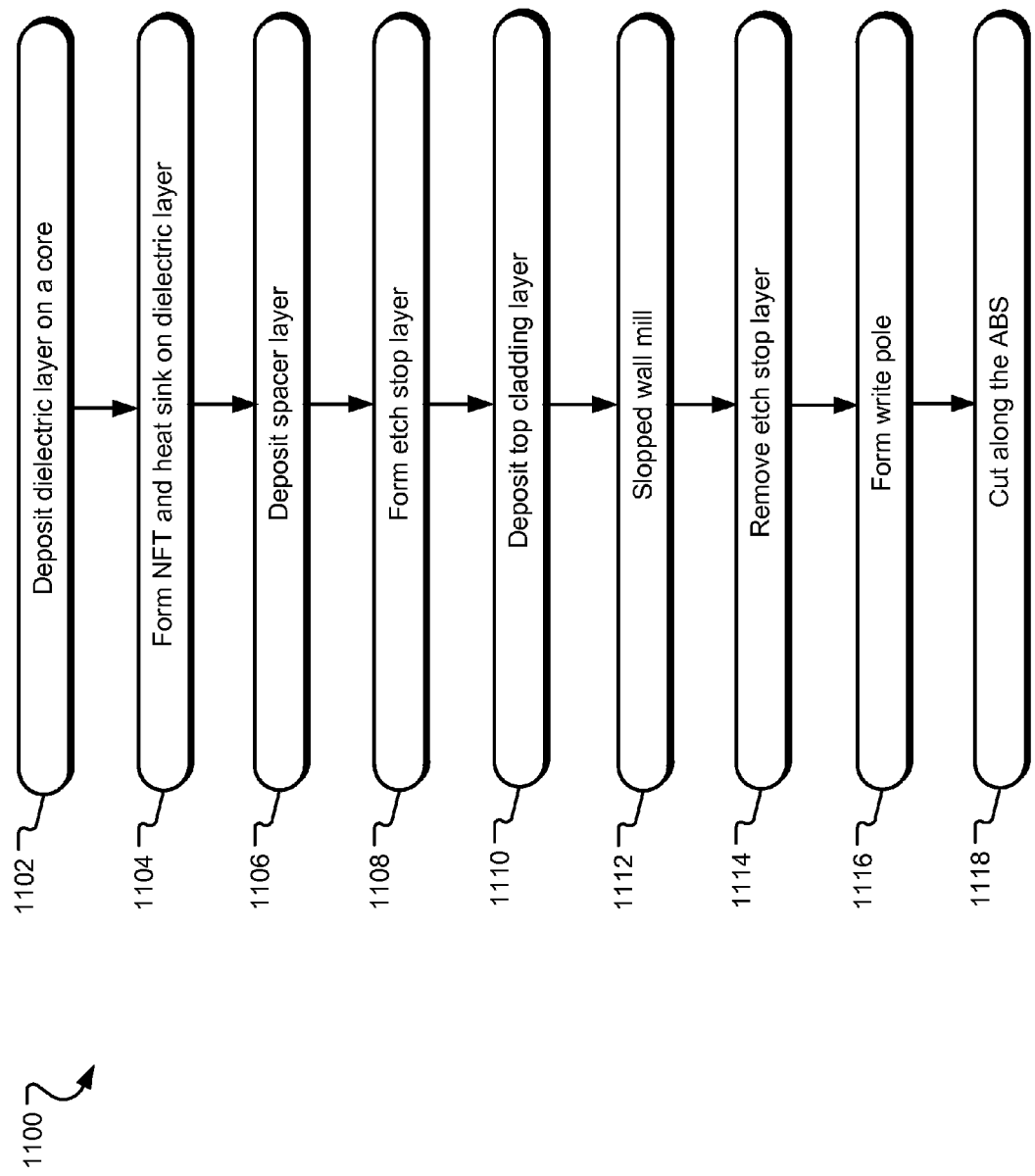
FIG. 11 illustrates a flowchart of a process for manufacturing a transducer head disclosed herein.

FIG. 11 illustrates a flowchart of a process 1100 for manufacturing a transducer head disclosed herein. Specifically, the process 1100 includes various operations for manufacturing a transducer head while controlling the NFT-to-pole spacing (NPS). The manufacturing of the transducer head may start with a core layer, which may be made of $Ta_2O_5$ or other similar material. An operation 1102 deposits a thin dielectric layer on the core layer. Subsequently, an operation 1104 forms the NFT and heat sink layer on the dielectric layer. The NFT may be for example, a lollipop type NFT with a peg and a disc. The heat sink may be made of a non-magnetic material, such as for example Au.

Subsequently, an operation 1106 deposits a spacer layer on the NFT, heat sink, and the dielectric layer. The thickness of the spacer layer may be accurately controlled and varied by an atomic layer deposition (ALD) process. Following the deposition of the spacer layer an operation 1108 forms an etch stop layer on the spacer layer. In one implementation, the etch stop layer is a single photo resist (PR) layer. The placement of the etch stop can be very well controlled using advanced lithography processes and the precision in the placement of the etch stop layer as a single photo resist is limited only by the capability of such advanced lithography process.

Alternatively, the etch stop layer may be made of a patterned etch-stop structure made of a thin amorphous carbon (a-C) material. Specifically, such a-C pattern may be made by a process flow including deposition, lithography, and etch process flow. Alternatively, the a-C pattern may be made of a process flow including lithography, deposition, and liftoff The etch stop layer made of a-C may be cleanly removed by $O_2$ ash. Yet alternatively, the etch stop layer may be made of a metal. Such metal etch stop layer provides high selectivity during a subsequent slope wall milling process. An example of such metal etch stop may be a chromium (Cr) etch stop. Such Cr etch stop may be later removed by a Cr wet etching process.

After forming of the etch stop layer, an operation 1110 deposits a top cladding layer. Subsequently, an operation 1112 removes parts of the top cladding and the heat sink material using a sloped wall milling process. In one implementation, the angle of the sloped wall milling process is such that the spacer layer between the etch stop layer and the NFT is not milled. The spacer layer is protected from being milled because of the etch stop layer. As a result of the sloped wall milling process, the etch stop layer remains in place over the spacer layer. Subsequently, an operation 1114 is used to remove the etch stop layer. The removal of the etch stop layer results in a partial transducer head that has a uniform spacer layer on top of an NFT peg.

Furthermore, the slope of the remaining spacer layer resulting from the sloped mill process and the slope of the heat sink layer are such that irrespective of the positioning of the air-bearing surface (ABS) along the length of the transducer the thickness of the spacer layer remains substantially constant. Such substantially constant thickness of the spacer layer allows for substantially uniform NFT-to-pole spacing (NPS) in the resulting transducer at the ABS. An operation 1116 forms a write pole layer on top of the spacer layer, the sloped pole heat sink layer and the sloped top cladding layer. In one implementation, the write pole layer may be made of a magnetic material such as CoNiFe, etc. After forming of the write pole, an operation 1118 cuts the partial transducer head along an air-bearing surface (ABS) such that the NPS is preserved to a desired value.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims. Although the present invention has been described with reference to preferred embodiments, workers skilled in the art will recognize that changes may be made in form and detail without departing from the scope of the invention. The implementations described above and other implementations are within the scope of the following claims.

What is claimed is:

1. A partial transducer head, comprising:
   a core layer;
   a spacer layer;
   a near field transducer (NFT) layer; and
   an etch stop layer formed at least partially on the spacer layer.

2. The partial transducer head of claim 1, further comprising a write pole formed on the etch stop layer.

3. The partial transducer head of claim 1, wherein the etch stop layer is made of amorphous carbon.

4. The partial transducer head of claim 1, wherein the etch stop layer is made of at least one of (i) metal and (ii) photo resist.

5. The partial transducer of claim 2, wherein the write pole is surrounded by heat sink material.

6. The partial transducer of claim 5, wherein the write pole is separated from a first return pole by a cladding layer.

7. The partial transducer of claim 5, wherein the write pole has a notched surface facing the NFT.

8. A transducer head, comprising:
   a write pole with a notched surface facing a near field transducer (NFT); and
   a heat sink layer surrounding the write pole at an air-bearing surface (ABS) of the transducer head, wherein the spacing between the NFT and the write pole is controlled during the manufacture of the transducer head by using a spacer layer and a photo resist.

9. The transducer head of claim 8, wherein the write pole is separated from a first return pole by a cladding layer.

10. The transducer head of claim 8, further comprising a core layer separating the NFT from a second return pole.

11. The transducer head of claim 10, further comprising a read sensor separated from the second return pole by a top shield.

12. The transducer head of claim 8, wherein the notched surface of the write pole has a curved shape.

13. The transducer head of claim 8, wherein the NFT intersects a surface of the write pole facing the NFT.

14. The transducer head of claim 8, wherein the notched surface of the write pole has a rectangular shape.

15. The transducer head of claim 8, wherein the notched surface of the write pole has a triangular shape.

16. A partial transducer head, comprising:
    a spacer layer;
    a near field transducer (NFT) layer; and
    an etch stop layer formed at least partially on the spacer layer.

17. The partial transducer head of claim 16, further comprising a core layer on the opposite side of the NFT from the side having a write pole layer.

18. The partial transducer head of claim 16, further comprising a cladding layer deposited on the etch stop layer.

19. The partial transducer head of claim 18, wherein the cladding layer is milled at a sloped angle.

* * * * *